(12) United States Patent
Kanamarlapudi et al.

(10) Patent No.: US 9,119,190 B2
(45) Date of Patent: Aug. 25, 2015

(54) METHOD AND APPARATUS FOR ENHANCING DATA RETRANSMISSION TO IMPROVE CALL PERFORMANCE

(71) Applicant: QUALCOMM Incorporated, San Diego, CA (US)

(72) Inventors: Sitaramanjaneyulu Mohan Kanamarlapudi, San Diego, CA (US); Chetan Gopalakrishnan Chakravarthy, San Diego, CA (US); Manmeet Singh, San Diego, CA (US); Aravindh Suriyamoorthy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 13/888,821

(22) Filed: May 7, 2013

(65) Prior Publication Data

US 2014/0036798 A1    Feb. 6, 2014

Related U.S. Application Data

(60) Provisional application No. 61/680,007, filed on Aug. 6, 2012.

(51) Int. Cl.
*G06F 11/00* (2006.01)
*H04L 1/00* (2006.01)
(Continued)

(52) U.S. Cl.
CPC ........... *H04W 72/0406* (2013.01); *H04L 1/187* (2013.01); *H04L 1/1832* (2013.01); *H04L 1/1835* (2013.01); *H04L 1/1864* (2013.01); *H04L 1/1874* (2013.01); *H04L 1/1896* (2013.01)

(58) Field of Classification Search
CPC ............ H04W 72/0406; H04L 1/1832; H04L 1/1835; H04L 1/1864; H04L 1/187; H04L 1/1874; H04L 1/1896
USPC .......................... 370/252, 253, 254, 328, 329
See application file for complete search history.

(56) References Cited

U.S. PATENT DOCUMENTS 6,519,223 B1    2/2003    Wager et al.
7,054,270 B2    5/2006    Yi et al.
(Continued)

FOREIGN PATENT DOCUMENTS

EP          2136501 A2     12/2009
EP          2139292 A2     12/2009
WO      WO-2005109778 A1  11/2005

OTHER PUBLICATIONS

3GPP TS 25.322 V11.2.0 (Mar. 2013), 3rd Generation Partnership Project; Technical Specification Group Radio Access Network; Radio Link Control (RLC) protocol specification (Release 11), 90 pages.

(Continued)

*Primary Examiner* — Chuong T Ho
(74) *Attorney, Agent, or Firm* — Charles Chesney

(57) ABSTRACT

A method and apparatus for enhancing data retransmission to improve call performance are described. At least one protocol data unit (PDU) may be transmitted from a transmitting entity to a receiving entity. The at least one PDU may be part of a service data unit (SDU). It may be determined to perform a communication re-establishment. As such, the SDU may be retransmitted, beginning with a first PDU transmitted as part of the SDU. In an aspect, the transmitting entity may be a radio link control (RLC) transmitting device and the receiving entity may be an RLC receiving device in communication with one another across a network. In another aspect, the transmitting entity may be a radio link control (RLC) transmitting protocol layer and the receiving entity may be a radio link control (RLC) receiving protocol layer both within a protocol stack of a device.

22 Claims, 13 Drawing Sheets

(51) Int. Cl.
*H04L 12/26* (2006.01)
*H04W 72/04* (2009.01)
*H04L 1/18* (2006.01)

(56) References Cited

U.S. PATENT DOCUMENTS

| | | | |
|---|---|---|---|
| 2006/0203752 A1* | 9/2006 | Ginzburg | 370/278 |
| 2007/0064600 A1 | 3/2007 | Jiang | |
| 2008/0069142 A1 | 3/2008 | Wu | |
| 2008/0130619 A1* | 6/2008 | Cha et al. | 370/346 |
| 2008/0188224 A1 | 8/2008 | Pani et al. | |
| 2008/0192671 A1* | 8/2008 | Torsner | 370/315 |
| 2008/0227442 A1 | 9/2008 | Pani et al. | |
| 2009/0103478 A1 | 4/2009 | Sammour et al. | |
| 2009/0161571 A1* | 6/2009 | Terry et al. | 370/252 |
| 2009/0175175 A1 | 7/2009 | Somasundaram et al. | |
| 2010/0135303 A1* | 6/2010 | Umesh et al. | 370/394 |
| 2011/0019568 A1* | 1/2011 | Kim et al. | 370/252 |
| 2013/0003688 A1* | 1/2013 | Wu | 370/329 |
| 2013/0021982 A1* | 1/2013 | Kim et al. | 370/328 |
| 2014/0092770 A1* | 4/2014 | Terry et al. | 370/252 |
| 2014/0204920 A1* | 7/2014 | Sharma et al. | 370/336 |
| 2015/0023370 A1* | 1/2015 | Sammour et al. | 370/465 |

OTHER PUBLICATIONS

3GPP TS 25.331 V11.5.0 (Mar. 2013), 3rd Generation Partnership Project; Technical Specification Group Radio Access Network; Radio Resource Control (RRC); Protocol specification (Release 11).
International Search Report and Written Opinion—PCT/US2013/053758—ISA/EPO—Nov. 7, 2013.

\* cited by examiner

METHOD AND APPARATUS FOR ENHANCING DATA RETRANSMISSION TO IMPROVE CALL PERFORMANCE

CLAIM OF PRIORITY UNDER 35 U.S.C. §119

The present application for patent claims priority to Provisional Application No. 61/680,007 entitled "METHODS AND APPAREATUSES FOR ENHANCING SERVICE DATA UNIT RETRANSMISSION FOR IMPROVING CALL PERFORMANCE" filed Aug. 6, 2012 and assigned to the assignee hereof and hereby expressly incorporated by reference herein.

BACKGROUND

1. Field

Aspects of the present disclosure relate generally to wireless communication systems, and more particularly, to enhancing data retransmission to improve call performance.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, as per the radio link control (RLC) layer protocol, whenever a user equipment (UE) (or other message-transmitting device, such as a Node B) receives a RESET command from a peer RLC entity, which may be a message-receiving device (such as a UE or network entity, e.g., a Node B or radio network controller), the UE will discard all previously transmitted protocol data units (PDUs). The UE may store these previously transmitted PDUs, which may be part of a larger service data unit (SDU), in a buffer when they have not yet been acknowledged as having been received by a receiving entity. Additionally, the UE discards any portions of partially-transmitted SDUs pending in a transmission queue at the UE (e.g., some PDUs of the SDU have been transmitted and some PDUs of the SDU are pending transmission in the transmission queue). After completion of this discarding procedure, the UE resumes transmission, starting with an SDU that came after the discarded SDU in the transmission queue. As such, an SDU, or PDUS of the SDU, may be lost.

Furthermore, when a message is transmitted in the uplink (UL) and a radio link control (RLC) re-establishment indication is concurrently received in the downlink (DL), the transmitted message and associated PDUs are discarded. Though the RLC protocol layer indicates the failure of the signaling message to a radio resource controller (RRC), the RRC does not include instructions for recovery of the transmitted message. As a result, the lost signaling message is not retransmitted by the RLC or upper layers. This can lead to a deadlock in the signaling procedure such that subsequent SDUs are not processed by a receiver. In some instances, this will lead to call release.

Thus improvements in message and data transmission in communications networks to avoid lost messages, data, and call release are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for wireless communication is described. The method may include transmitting at least one protocol data unit (PDU) from a transmitting entity to a receiving entity. The at least one PDU may be part of a service data unit (SDU). The method may include determining to perform a communication re-establishment. The method may include retransmitting the SDU, beginning with a first PDU transmitted as part of the SDU, in response to determining to perform the communication re-establishment.

In an aspect, a computer program product for wireless communication is described. The computer program product may include a computer-readable medium comprising code. The code may cause a computer to transmit at least one protocol data unit (PDU) from a transmitting entity to a receiving entity. The at least one PDU may be part of a service data unit (SDU). The code may cause a computer to determine to perform a communication re-establishment. The code may cause a computer to retransmit the SDU, beginning with a first PDU transmitted as part of the SDU, in response to determining to perform the communication re-establishment.

In an aspect, an apparatus for wireless communication is described. The apparatus may include means for transmitting at least one protocol data unit (PDU) from a transmitting entity to a receiving entity. The at least one PDU may be part of a service data unit (SDU). The apparatus may include means for determining to perform a communication re-establishment. The apparatus may include means for retransmitting the SDU, beginning with a first PDU transmitted as part of the SDU, in response to determining to perform the communication re-establishment.

In an aspect, an apparatus for wireless communication is described. The apparatus may include at least one memory and a communication manager in communication with the memory. The communication manager may be configured to transmit at least one protocol data unit (PDU) from a transmitting entity to a receiving entity. The at least one PDU may be part of a service data unit (SDU). The communication manager may be configured to determine to perform a communication re-establishment. The communication manager may be configured to retransmit the SDU, beginning with a first PDU transmitted as part of the SDU, in response to determining to perform the communication re-establishment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
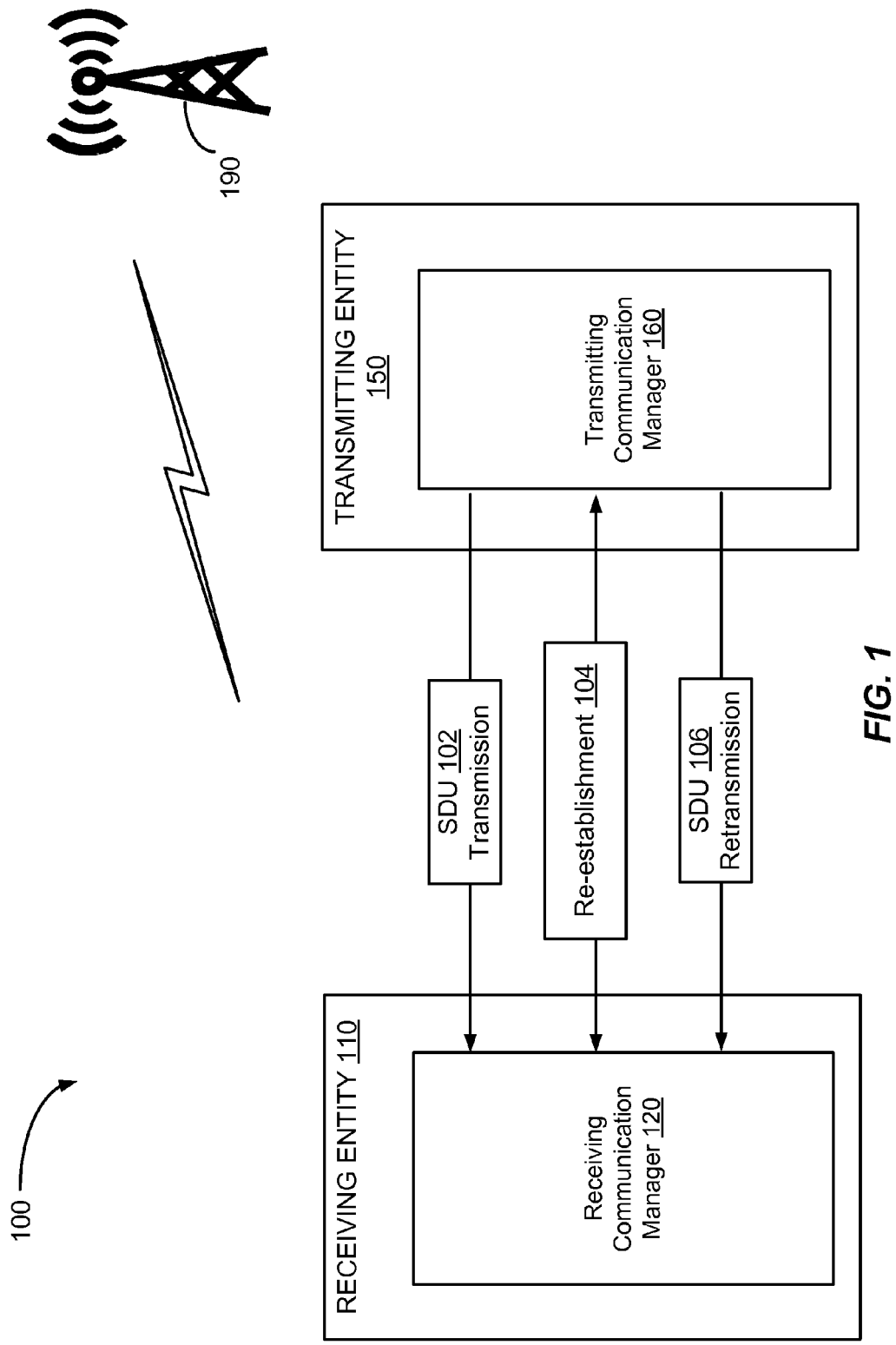
FIG. 1 is a block diagram of an example wireless system, including a receiving entity and a transmitting entity in communication with one another.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure teaches methods and apparatus for improved message communication after a device, or protocol layer, determines that all or part of a previously-transmitted message should be discarded in response to a re-establishment.

In an aspect, a network (e.g., a network entity) may determine to perform a re-establishment as between two radio link controller (RLC) peer entities (e.g., an RLC receiving device and an RLC transmitting device). In an aspect, a network (e.g., a network entity) may determine to perform a re-establishment between two protocol layers (e.g., an RLC receiving protocol layer and an RLC transmitting protocol layer) within a protocol stack of a single device, such as, for example, a user equipment (UE) or another network entity (e.g., a Node B). The network (e.g., a network entity) may determine to perform the re-establishment for a variety of reasons, including, in non-limiting examples: to adjust RLC packet data unit (PDU) size or some other RLC configuration, during a state transition from cell forward access channel (CELL_FACH) to cell dedicated channel (CELL_DCH), and/or during a radio network controller (RNC) relocation in which case the RLC layer may be established on the new RNC network entity, or the like. Alternatively, or in addition, a receiving entity and/or a transmitting entity may be configured to determine that a re-establishment condition exists, such as, in non-limiting examples: a maximum number of PDU retransmissions has been reached, a threshold bad channel quality value has been met or exceeded, or some other metric.

In an aspect, two RLC peer devices may be in communication with one another across a network. An RLC transmitting device may receive an RLC RESET command from an RLC receiving device when a service data unit (SDU) has only been partially transmitted by the RLC transmitting device (e.g., less than all of the packet data units (PDUs) that make up an SDU have been transmitted), the RLC transmitting device may initiate an SDU discard procedure, such that the RLC transmitting device may push the previously transmitted PDUs to a transmission queue, discard the previously transmitted PDUs from a buffer, and retransmit the full SDU starting at the first byte of the first PDU of the SDU.

Similarly, where any SDUs have been fully transmitted by the RLC transmitting device but have not yet been acknowledged by the RLC receiving device before receipt of the RLC RESET command, the RLC transmitting device may push such SDUs back into the transmission queue for full retransmission beginning at their first bytes. Through such operation, the changes of signaling radio bearer (SRB) and packet-switched radio access bearer (RAB) data transmissions that might otherwise trigger an RLC unrecoverable error and result in a circuit-switched call drop can be minimized. Furthermore, even though some lost SDUs may be recovered according to Transmission Control Protocol (TCP) level retransmissions according relevant standards, the present methods and apparatus obviate throughput degradation associated with executing TCP backoff algorithms when TCP packets are lost.

In another aspect, a radio link control (RLC) transmitting protocol layer and an RLC receiving protocol layer may be within a protocol stack of a single device, such as, for example, a user equipment or another network entity (e.g., a Node B). The RLC transmitting protocol layer may transmit PDUs to the RLC receiving protocol layer. The RLC transmitting protocol layer may receive a message (e.g., a layer 3 message) from the RLC receiving protocol layer indicating a communication re-establishment. The re-establishment message may be received when one or more PDUs have only been partially transmitted to the RLC receiving protocol layer and/or the re-establishment message may be received after one or more PDUs have been transmitted to the RLC receiving protocol layer, but before being acknowledged. In response to the re-establishment message, the RLC transmitting protocol layer may initiate a discard procedure such that the RLC transmitting protocol layer may push the previously transmitted PDUs to a transmission queue, discard the previously transmitted PDUs from a buffer, and retransmit the PDUs starting at the first byte of an SDU made up of the PDUs.

Referring to FIG. 1, a wireless communication system 100 is illustrated that facilitates improved data retransmission between a receiving entity 110 and a transmitting entity 150 in communication with a base station 190. In an aspect, receiving entity 110 and/or transmitting entity 150 may be peer radio link control (RLC) devices. In another aspect, receiving entity 110 and/or transmitting entity 150 may be protocol layers within a single device in communication with a network via base station 190. More particularly, and in the aspect, receiving entity 110 and/or transmitting entity 150 may be a radio resource control (RRC) protocol layer and/or a radio link controller (RLC) protocol layer within the single device.

Receiving entity 110 and/or transmitting entity 150 may be, or may be within, a mobile apparatus or a network entity. The mobile apparatus is commonly referred to as a user equipment (UE) in UMTS applications, and may be referred to as such throughout the present disclosure. A mobile apparatus also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A network entity may be, for example, an access point, base station (BS), Node B, a relay, a peer-to-peer device, an authentication, authorization and accounting (AAA) server, a mobile switching center (MSC), a radio network controller (RNC), or the like.

Receiving entity 110 includes receiving communication manager 120 and transmitting entity 150 includes transmitting communication manager 160, each of which may be configured to manage the communication behavior of its host entity. Such behavior may include, for example, transmitting messages, receiving messages, processing messages, and/or managing PDU and/or SDU transmission and retransmission behavior of the receiving entity 110 and transmitting entity 150, respectively.

Transmitting communication manager 160 may be configured to transmit an SDU transmission 102, e.g. transmitting at least one PDU that is part of the SDU, to receiving entity 110. Subsequently, a communication re-establishment 104 may take place between transmitting entity 150 and receiving entity 110. The network (e.g., an RNC) may determine to perform the re-establishment for a variety of reasons, including, in non-limiting examples: to adjust RLC packet data unit (PDU) size or some other RLC configuration, during a state transition from cell forward access channel (CELL_FACH) to cell dedicated channel (CELL_DCH), and/or during a radio network controller (RNC) relocation in which case the RLC layer may be established on the new RNC network entity, or the like. Alternatively, or in addition, receiving entity 110 and/or transmitting entity 150 may be configured to determine that a re-establishment condition exists, such as, in non-limiting examples: a maximum number of PDU retransmissions has been reached, a threshold bad channel quality value has been met or exceeded, or some other metric.

Various communications and processes may take place between receiving entity 110 and transmitting entity 150 to perform, and complete, the re-establishment. Re-establishment 104 of FIG. 1 represents such aspects of a re-establishment as between receiving entity 110 and transmitting entity 150.

In the aspect where receiving entity 110 and/or transmitting entity 150 are peer RLC devices, for example, transmitting entity 150 and/or receiving entity 110 may transmit and/or receive an RLC RESET command and respond with an RLC RESET acknowledgment command. In the aspect, the re-establishment 104 also may include transmitting entity 150 and/or receiving entity 110 transmitting and/or receiving a move receive window (MRW) command and an MRW acknowledgment command.

In the aspect where receiving entity 110 and/or transmitting entity 150 are protocol layers within a single device, the re-establishment 104 may include receiving a layer 3 (L3) radio resource control (RRC) message from the network, via, e.g., base station 190, indicating that a radio link controller (RLC) entity (e.g., the RLC layer, which may comprise receiving entity 110 and/or transmitting entity 150) may be re-established.

Upon completion of the re-establishment 104, transmitting entity 150, via transmitting communication manager 160, may be configured to send an acknowledgment message (not shown), and retransmit the SDU, e.g., SDU retransmission 106, beginning with a first PDU transmitted as part of the SDU, to receiving entity 110.

Figure 2:
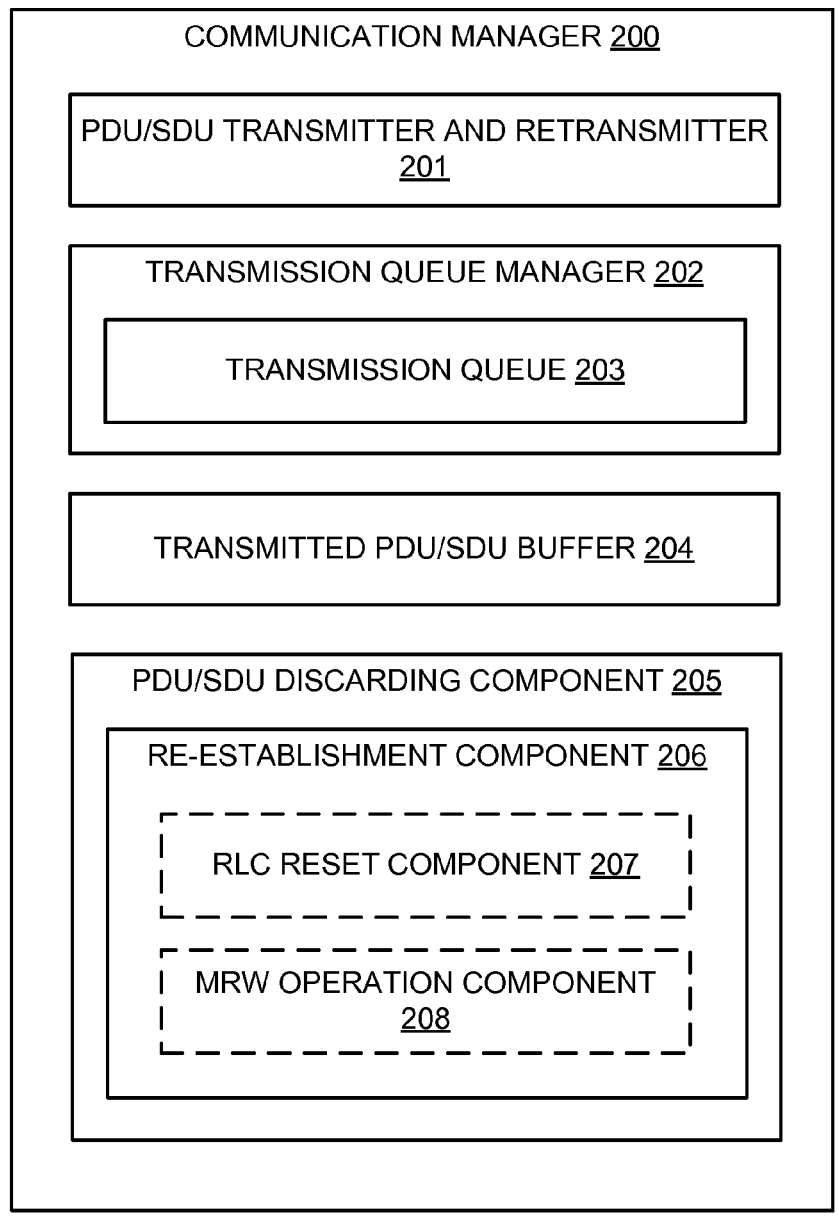
FIG. 2 is a block diagram of a communication manager according to aspects of the present disclosure.

Referring to FIG. 2, a communication manager 200 may be configured to, in non-limiting examples, transmit messages, receive messages, process messages, and/or manage PDU and/or SDU transmission and retransmission behavior of its host entity. Communication manager 200 may be transmitting communication manager 160 within transmitting entity 150 and/or receiving communication manager 120 within receiving entity 110.

Communication manager 200 may include a PDU/SDU transmitter and retransmitter 201, which may be configured to transmit and potentially retransmit one or more PDUs of one or more SDUs. PDU/SDU transmitter and retransmitter 201 may be a transmitter, antenna and operational circuitry, a transceiver, or the like.

Furthermore, communication manager 200 may include a transmission queue manager 202, which may be configured to control and manage the behavior, addressing, contents, order of transmission, or the like of PDUs and SDUs to be transmitted to a receiving entity. Transmission queue 203 may be a memory, or data store, that is able to store and organize PDUs and may communicate with PDU/SDU transmitter and retransmitter 201 for transmission or retransmission of the PDUs and SDUs.

In an aspect, transmission queue manager 202 also may be configured to receive one or more previously transmitted PDUs or SDUs from a transmitted PDU/SDU buffer 204, which may store the contents of previously transmitted messages for potential retransmission. Transmitted PDU/SDU buffer 204 may include circuitry or may utilize a processor to copy one or more previously transmitted PDUs and SDUs stored in the buffer and push one or more unacknowledged PDUs into the transmission queue 203 for retransmission, beginning at the first byte of the first previously transmitted PDU of a previously-transmitted SDU.

Furthermore, communication manager 200 may include a PDU/SDU discarding component 205, which may be configured to initiate a discard procedure, which may signal the communication manager 200 to copy any unacknowledged PDUs or SDUs in the transmitted PDU/SDU buffer 204 and/ or push these unacknowledged PDUs or SDUs or their copies into the transmission queue 203. Furthermore, once the unacknowledged PDUs or SDUs have been pushed into the transmission queue 203, PDU/SDU discarding component 205 may discard the previously transmitted PDUs or SDUs from the transmitted PDU/SDU buffer 204 or another storage location.

In an additional aspect, PDU/SDU discarding component 205 may include a re-establishment component 206, which may be configured to determine to perform a communication re-establishment.

For example, in an aspect where receiving entity 110 and/ or transmitting entity 150 are RLC peer devices, re-establishment component 206 may, optionally, be configured to initiate an SDU discard procedure based on receiving a communication re-establishment message from receiving entity 110, transmitting entity 150, and/or the network. Further, in an aspect, re-establishment component 206 may be configured to initiate an SDU discard procedure based on determining that a re-establishment condition exists.

In the RLC peer device aspect, re-establishment component 206 may include an RLC reset component 207 and a move receive window (MRW) operation component 208. In an aspect, the re-establishment message may be an RLC RESET command, and communication manager 200 may be configured to initiate the SDU discard procedure based on determining to perform a communication re-establishment and/or receiving an RLC RESET command from a receiving device. For example, communication manager 200 may determine to perform a communication re-establishment based on an indication from the network, via base station 190, or some other component. In another example, communication manager 200 may be configured to determine that a re-establishment condition exists and, in response, initiate the SDU discard procedure, and send, to a receiving device, an RLC RESET command.

Communication manager 200 may be configured to determine whether the SDU discard procedure has been successfully completed. For example, successful completion may be based on determining that the previously transmitted PDUs or SDUs have been discarded from the transmitted PDU/SDU buffer 204 and/or pushed to the transmission queue 203. Furthermore, the RLC reset component 207 may be configured to transmit an RLC RESET acknowledgement message (ACK) upon receipt of an RLC RESET message or upon successful completion of the SDU discard procedure.

In the RLC peer device aspect, re-establishment component 206 also may include MRW operation component 208, which may be configured to generate, transmit and/or receive an MRW command or MRW command acknowledgment. In one aspect, PDU/SDU discarding component 205, in combination with MRW operation component 208, may be configured to determine whether an SDU discard procedure has been successfully completed by transmitting an MRW command to an RLC receiving device and receiving an MRW command acknowledgment message from the receiving device indicating that the receiving device has discarded the SDU and has moved a receive window in preparation for receiving a retransmitted SDU and/or PDUs. In another aspect, PDU/SDU discarding component 205 and/or MRW operation component 208 may be configured to determine whether an SDU discard procedure has been successfully completed by receiving an MRW command from an RLC receiving device and sending an MRW command acknowledgment message to the receiving device indicating that the transmitting device has discarded the SDU and has moved a receive window in preparation for receiving a retransmitted SDU. An entity receiving an MRW command may identify one or more previously-received SDUs that are to be discarded or should not be expected to arrive. The entity receiving the MRW command may then discard the previously-received SDUs, move its receive window to avoid any delay associated with waiting for SDUs that have not yet been received and have been discarded at the transmitting device, and generate and transmit an MRW command acknowledgment to the device from which it received the MRW command.

In an aspect where receiving entity 110 and transmitting entity 150 are protocol layers within a single device in communication with a network, re-establishment component 206 may be configured to receive an L3 RRC message from the network indicating a communication re-establishment. The re-establishment component 206 also may be configured to send an L3 RRC response message to the network. In the RLC protocol layer aspect, re-establishment component 206 may, optionally, include RLC reset component 207 and MRW operation component 208, which may operate as described herein, after transmission of the response message.

In any event, upon completion of the re-establishment procedure, the PDU/SDU discarding component 205 may communicate to PDU/SDU transmitter and retransmitter 201 that the partially transmitted and/or unacknowledged SDUs have been successfully moved to the transmission queue 203. As such, the PDU/SDU transmitter and retransmitter 201 may retransmit the one or more SDUs beginning at the first byte of the first PDU of the SDU. Furthermore, re-establishment component 206 may be configured to return an acknowledgment message to the receiving entity to indicate that the re-establishment procedure has been successfully completed.

Figure 3:
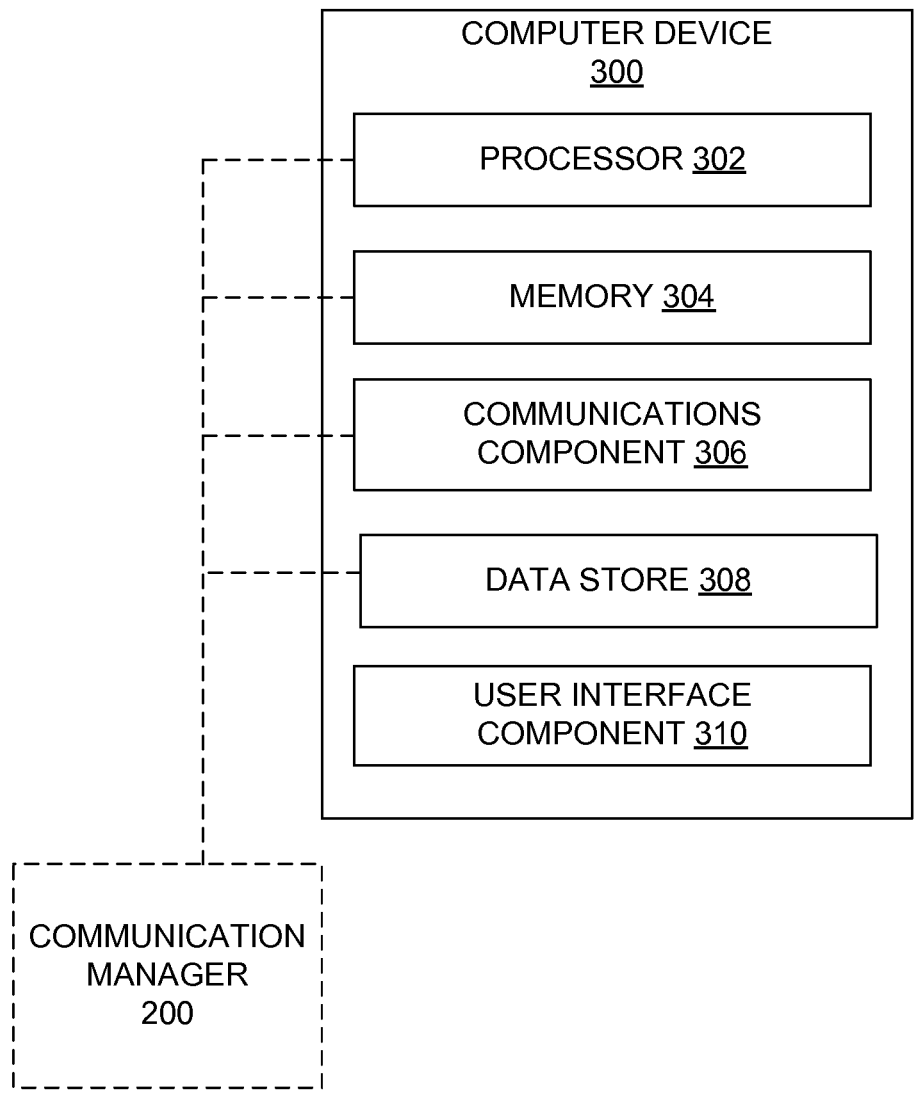
FIG. 3 is a block diagram illustrating an example of a computer device having aspects of the present disclosure.

Referring to FIG. 3, in one aspect, a communication manager 200 may be represented by a specially programmed or configured computer device 300. Communication manager 200, which may operate as described herein with respect to FIG. 2, may be receiving communication manager 120 and/or transmitting communication manager 160. For example, the special programming or configuring of computer device 300 may be programming or configuring to perform that respective functions described herein for the respective entity, such as receiving communication manager 120 and/or transmitting communication manager 160.

Computer device 300 includes a processor 302 specially configured to carry out processing functions associated with one or more of components and functions described herein with respect to communication manager 200 and its components. Processor 302 can include a single or multiple set of processors or multi-core processors. Moreover, processor 302 can be implemented as an integrated processing system and/or a distributed processing system.

Computer device 300 further includes a memory 304, such as for storing data used herein and/or local versions of applications and/or instructions or code being executed by processor 302, such as to perform the functions of the respective entities described herein. Memory 304 can include any type of memory usable by a computer, such as random access memory (RAM), read only memory (ROM), tapes, magnetic discs, optical discs, volatile memory, non-volatile memory, and any combination thereof. In an aspect, memory 304 may include transmitted PDU/SDU buffer 204 and/or transmission queue 203.

Further, computer device 300 includes a communications component 306 that provides for establishing and maintaining communications with one or more parties utilizing hardware, software, and services as described herein. Communications component 306 may carry communications between components on computer device 300, as well as between computer device 300 and external devices, such as devices located across a communications network and/or devices serially or locally connected to computer device 300. For example, communications component 306 may include one or more buses, and may further include transmit chain components and receive chain components associated with a transmitter and receiver, respectively, or a transceiver, operable for interfacing with external devices. In an aspect, communications component 306 may include PDU/SDU transmitter and retransmitter 201.

Additionally, computer device 300 may further include a data store 308, which can be any suitable combination of hardware and/or software, that provides for mass storage of information, databases, and programs employed in connection with aspects described herein. For example, data store 308 may be a data repository for applications not currently being executed by processor 302. In an aspect, data store 308 may include transmitted PDU/SDU buffer 204 and/or transmission queue 203.

Computer device 300 may additionally include a user interface component 310 operable to receive inputs from a user of computer device 300, and further operable to generate outputs for presentation to the user. User interface component 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 310 may include one or more output devices, including but not limited to a display, a speaker, a haptic feedback mechanism, a printer, any other mechanism capable of presenting an output to a user, or any combination thereof. In an additional aspect, a user using the user interface component 310 may set one of a first subscription or a second subscription as a dedicated data service (DDS) for the computer device 300.

Figure 4:
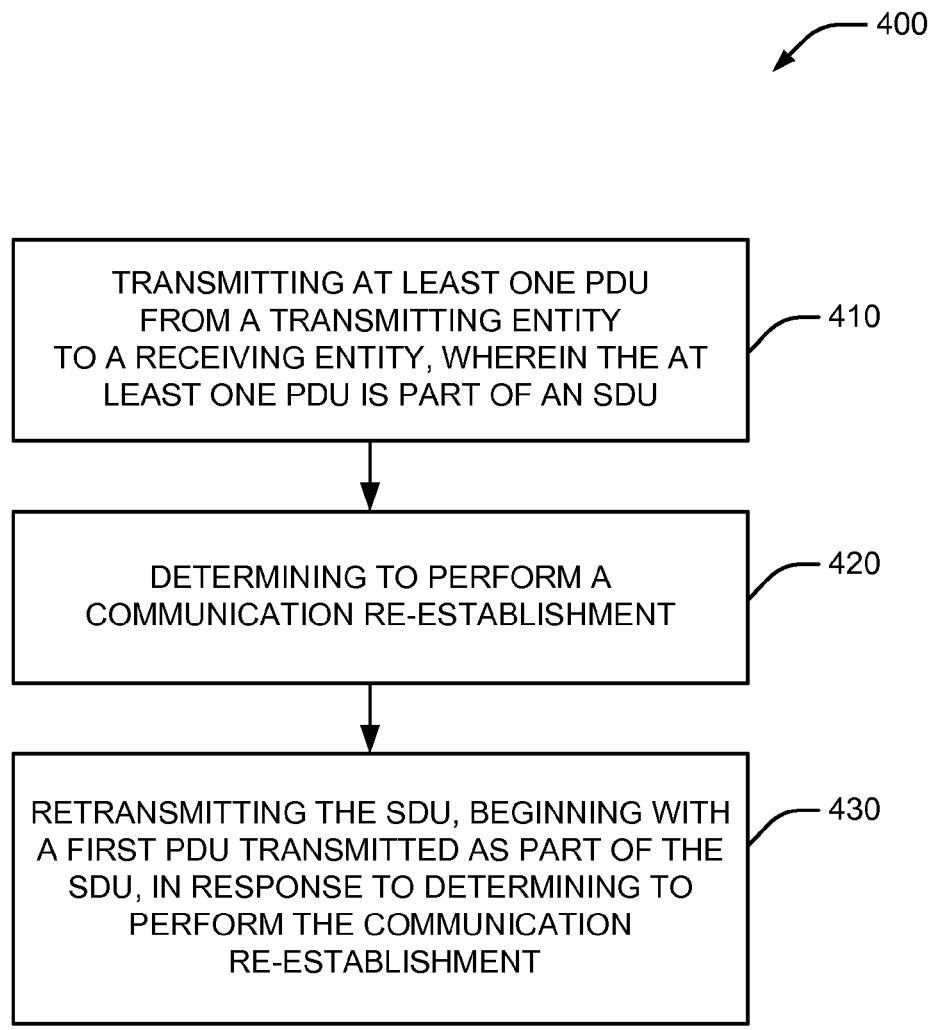
FIG. 4 is a flow chart of a method for improved message transmission according to aspects of the present disclosure.

Referring to FIG. 4, a method 400 for improved message transmission according to aspects of the present disclosure is shown. The method 400 may be performed by receiving entity 110 and/or transmitting entity 150. In an aspect, the transmitting entity and the receiving entity are RLC peer devices. In another aspect, the transmitting entity and the receiving entity are protocol layers within a single device.

At 410, the method 400 includes transmitting at least one protocol data unit (PDU) from a transmitting entity to a receiving entity, wherein the at least one PDU is part of a service data unit (SDU). In an aspect, communication manager 200 (which may be receiving communication manager 120 and/or transmitting communication manager 160) and/or PDU/SDU transmitter and retransmitter 201 may be configured to transmit at least one PDU, which is part of an SDU, to receiving entity 110.

At 420, the method 400 includes determining to perform a communication re-establishment. In an aspect, communication manager 200 (which may be receiving communication manager 120 and/or transmitting communication manager 160), PDU/SDU discarding component 205, and/or re-establishment component 206 may be configured to determine to perform a communication re-establishment based on an indication from the network or another component and/or based on determining that a re-establishment condition exists. Additionally, further aspects of determining to perform a communication re-establishment are described herein in reference to action 520 of FIG. 5 and action 620 of FIG. 6.

At 430, the method 400 includes retransmitting the SDU, beginning with a first PDU transmitted as part of the SDU, in response to determining to perform the communication re-establishment. In an aspect, communication manager 200 (which may be receiving communication manager 120 and/or transmitting communication manager 160) and/or PDU/SDU transmitter and retransmitter 201 may be configured to retransmit the SDU in response to determining to perform the communication re-establishment. For example, and in an aspect, the SDU may be retransmitted after completion of the re-establishment.

Figure 5:
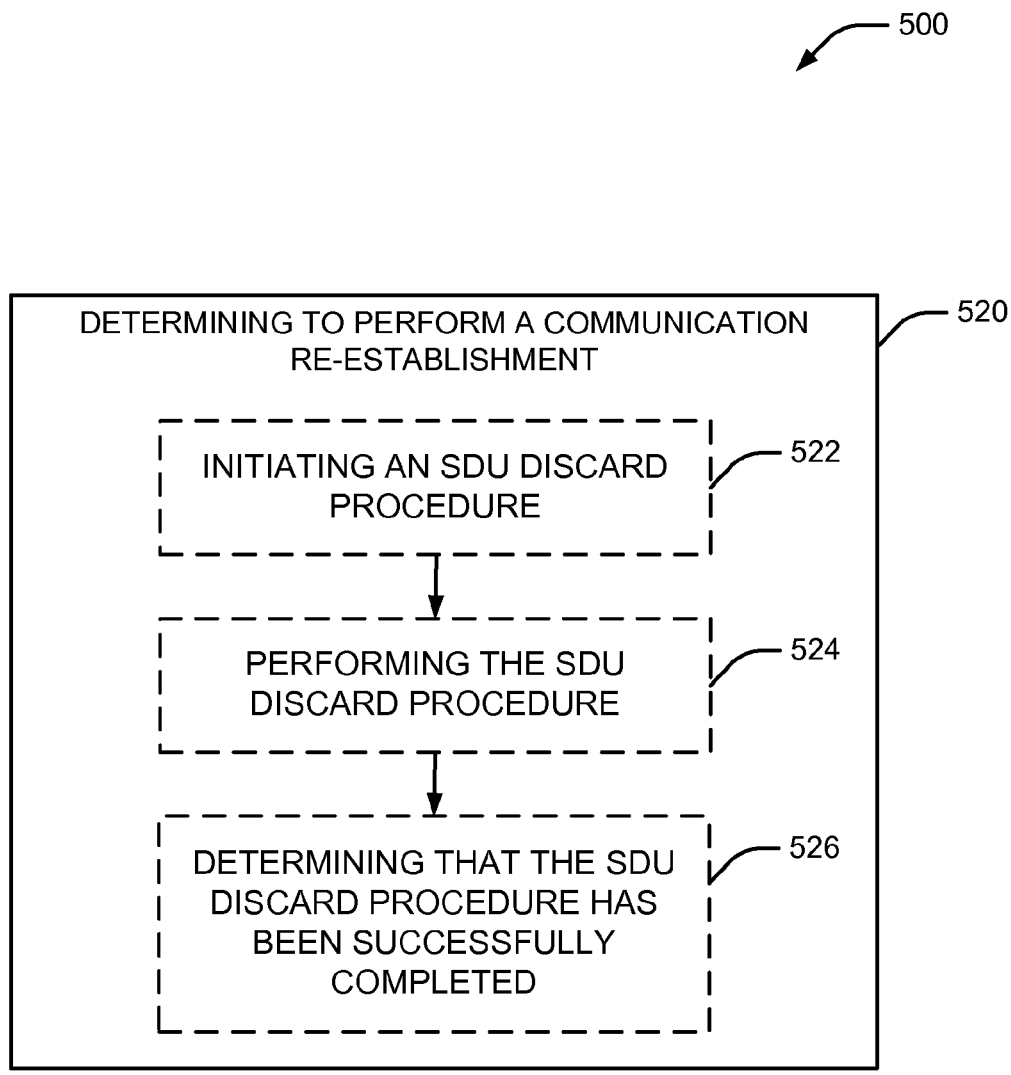
FIG. 5 is a flow chart of a method for improved message transmission between an RLC transmitting device and an RLC receiving device according to aspects of the present disclosure.

Referring to FIG. 5, a method 500 includes additional aspects of method 400 for improved message transmission according to aspects of the present disclosure. The method 500 may be performed by transmitting entity 150 and/or receiving entity 110. More particularly, and in an aspect, the receiving entity 110 and/or transmitting entity 150 of method 500 may be peer RLC devices.

At 520, the method 500, which may be similar to 420 of method 400, includes determining to perform a communication re-establishment. In the example of method 500, the action of 520 may include actions 522, 524, and 526.

At 522, the method 500 may include initiating an SDU discard procedure. For example, communication manager 200 (which may include receiving communication manager 120 and/or transmitting communication manager 160) may be configured to initiate an SDU discard procedure. The SDU discard procedure may be initiated based on communication manager 200 determining to perform the communication re-establishment as described herein.

At 524, the method 500 may include performing the SDU discard procedure. For example, transmitting entity 150, communication manager 200 (which may be transmitting communication manager 160), and/or PDU/SDU discarding component 205 may perform an SDU discard procedure. The SDU discard procedure may include determining that at least one or more PDUs associated with the SDU have not been acknowledged by receiving entity 110 and/or because the SDU has only been partially-transmitted to receiving entity 110. The SDU discard procedure may include moving the SDU to a transmission queue, in an original order, for retransmission of the SDU to receiving entity 110, as described herein.

At 526, the method 500 may include determining that the SDU discard procedure has been successfully completed. In an aspect, the transmitting entity 150, communication manager 200 (which may be transmitting communication manager 160), and/or PDU/SDU discarding component determines that the SDU discard procedure has been successfully completed.

In an aspect, receiving entity 110, communication manager 200 (which may be receiving communication manager 120), and/or PDU/SDU discarding component 205 may initiate an SDU discard procedure and determine that it has been successfully completed.

Figure 6:
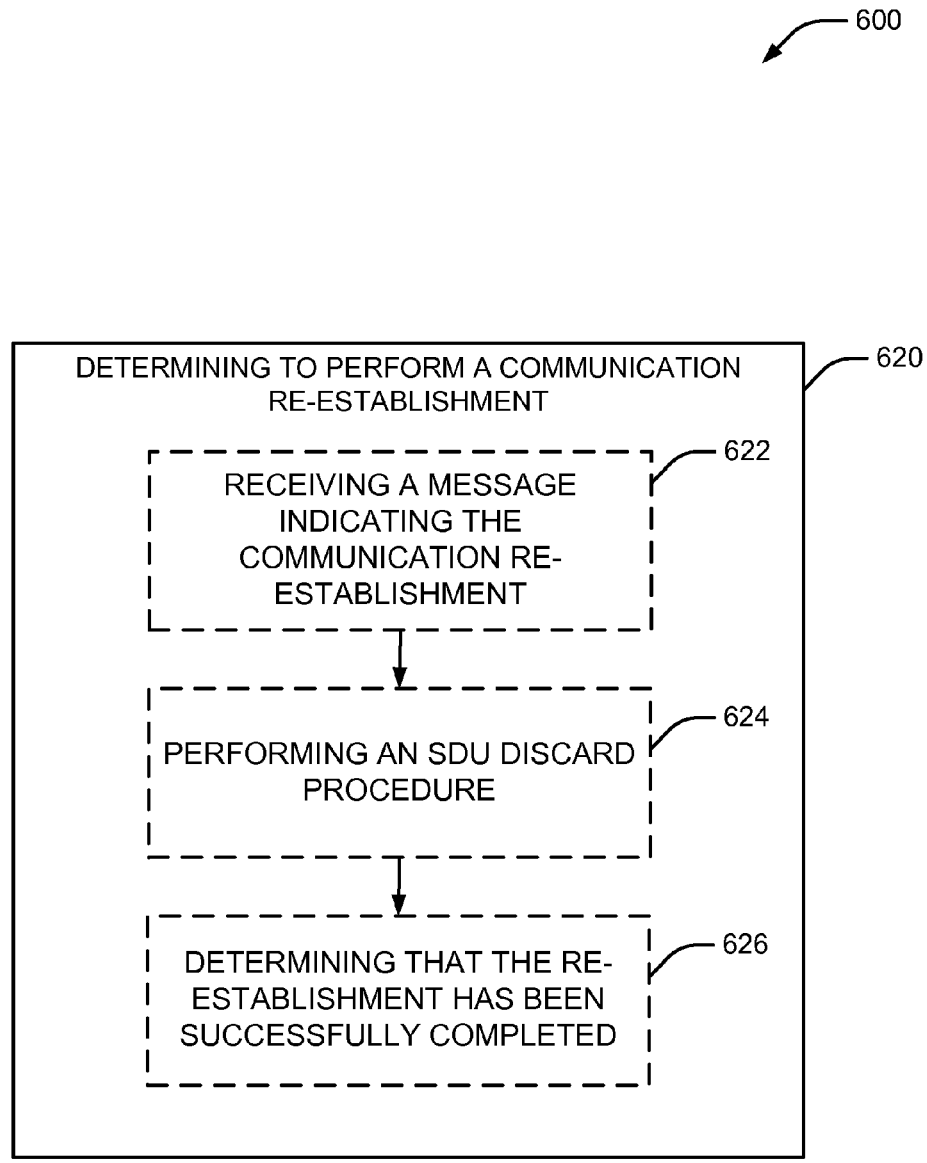
FIG. 6 is a flow chart of a method for improved message transmission between an RLC transmitting protocol layer and an RLC receiving protocol layer according to aspects of the present disclosure

Referring to FIG. 6, a method 600 includes additional aspects of method 400 for improved message transmission according to aspects of the present disclosure. The method 600 may be performed by receiving entity 110 and/or transmitting entity 150. More particularly, and in an aspect, receiving entity 110 and/or transmitting entity 150 may be protocol layers within a single device in communication with a network. For example, receiving entity 110 and/or transmitting entity 150 may be an RRC layer and/or an RLC layer within the single device.

At 620, which may be similar to 420 of method 400, the method 600 includes determining to perform a communication re-establishment. In the example of method 600, action 620 may include actions 622, 624, and 626.

At 622, the method 600 includes receiving a message indicating the communication re-establishment. An L3 RRC message may be received from the network indicating a communication re-establishment. For example, transmitting entity 150, communication manager 200 (which may be transmitting communication manager 160), PDU/SDU discarding component 205, and/or re-establishment component 206 may receive a message indicating the communication re-establishment as described herein.

At 624, the method 600 includes performing an SDU discard procedure. Receiving entity 110, transmitting entity 150, communication manager 200 (which may be receiving communication manager 120 and/or transmitting communication manager 160), and/or PDU/SDU discarding component 205 may perform an SDU discard procedure. The SDU discard procedure may include determining that at least one or more PDUs associated with the SDU have not been acknowledged by receiving entity 110 and/or because the SDU has only been partially-transmitted to receiving entity 110. The SDU discard procedure may include moving the SDU to a transmission queue, in an original order, for retransmission of the SDU to receiving entity 110, as described herein.

At 626, the method 600 includes determining that the re-establishment has been successfully completed. Transmitting entity 150, receiving entity 110, communication manager 200 (which may be receiving communication manager 120 and/or transmitting communication manager 160), PDU/SDU discarding component 205, and/or re-establishment component 206 may determine that the re-establishment has been successfully completed and, as a result, the SDU is ready for retransmission.

Figure 7:
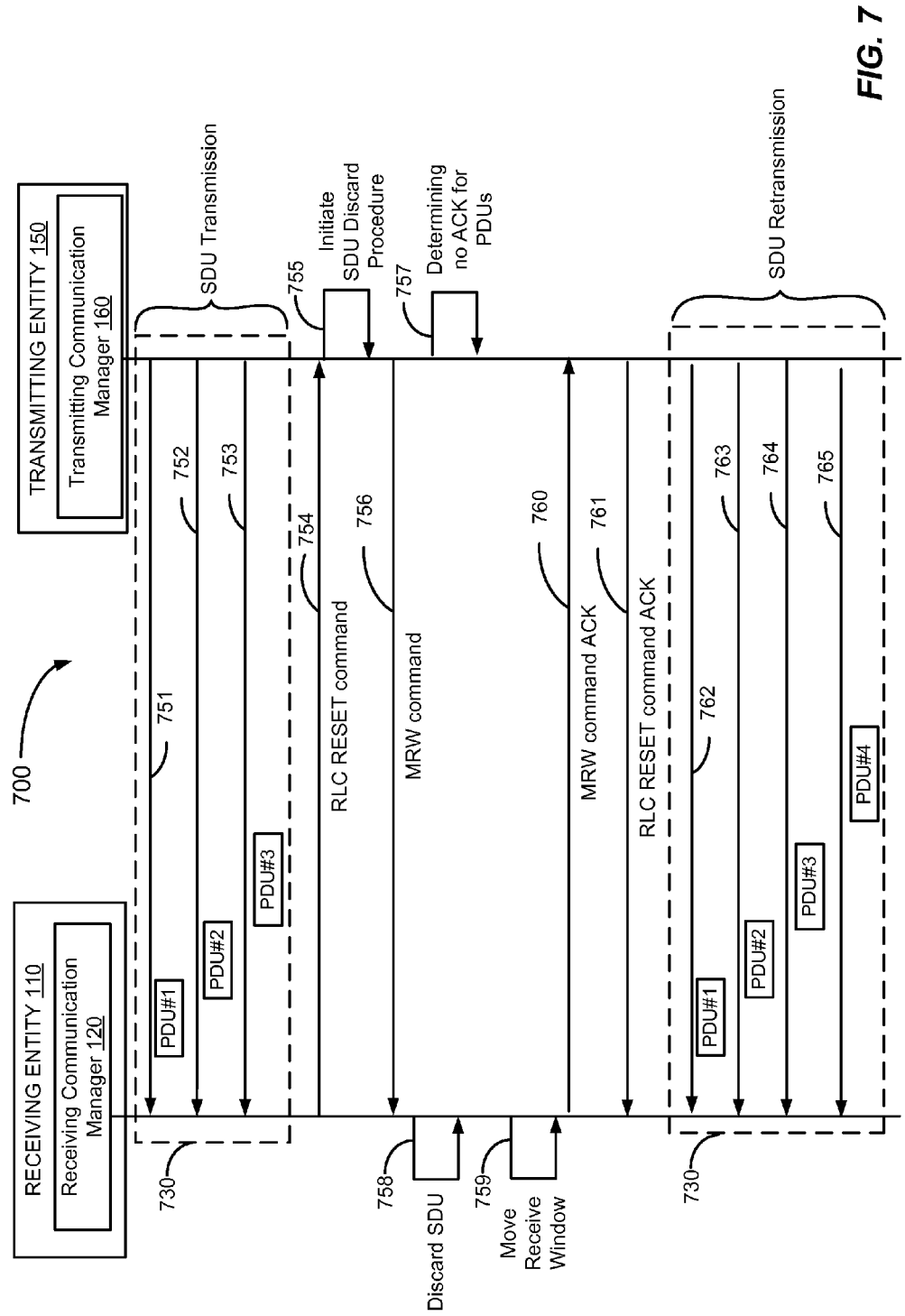
FIG. 7 is a message flow diagram of communications between an RLC receiving device and an RLC transmitting device.

Referring to FIG. 7, a message flow 700 shows communication between receiving entity 110, including receiving communication manager 120, and transmitting entity 150, including transmitting communication manager 160, according to an aspect of the present disclosure. The actions described herein with respect to message flow 700 may be performed by receiving communication manager 120 and/or transmitting communication manager 160. More particularly, and in the example of FIG. 7, the receiving entity 110 and/or transmitting entity 150 may be peer RLC devices.

At 751, transmitting entity 150 begins transmission of an SDU 730 by sending PDU#1. For example, SDU 730 may have been divided into four PDUs (PDU#1, PDU#2, PDU#3, and PDU#4) for transmission.

At 752, transmitting entity 150 transmits PDU#2 to receiving entity 110. At 753, transmitting entity 150 transmits PDU#3 to receiving entity 110. As such, and in the example, only three of the four PDUs that make up SDU 730 have been transmitted to receiving entity 110. Thus, SDU 730 has only been partially-transmitted by transmitting entity 150 to receiving entity 110 at this point. Furthermore, and for example, SDU 730 may not be acknowledged (as received) by receiving entity 110 because it has not been completely transmitted (e.g., PDU#4 has not yet been transmitted).

At 754, transmitting entity 150 receives an RLC RESET command from receiving entity 110. The RLC RESET command may have been triggered based on a determination to perform a communication re-establishment.

At 755, transmitting entity 150 initiates an SDU discard procedure. As described herein, transmitting entity 150, via transmitting communication manager 160, may be configured to move previously-transmitted, but not acknowledged, PDUs and SDUs to the transmission queue 743. For example, SDU 730, including PDU#1, PDU#2, PDU#3, and PDU#4, is moved, or copied, into s transmission queue.

At 756, transmitting entity 150 sends an MRW command to receiving entity 110, as described herein.

At 757, transmitting entity 150 determines that PDU#1, PDU#2, and PDU#3 have not been acknowledged by receiving entity 110.

At 758, and upon receipt of the MRW command, receiving entity 110 discards the previously-received SDUs, and, at 759, moves its receive window to account for PDUs and SDUs that it will not receive (e.g., PDUs and SDUs discarded at transmitting entity 150) and previously-transmitted PDUs and SDUs that will be retransmitted and, as such, it may receive again.

At 760, receiving entity 110 transmits an MRW acknowledgment command to transmitting entity 150. At 761, and upon determining successful completion of the SDU discard procedure, RLC transmitting device transmits an RLC RESET acknowledgment command to receiving entity 110. Transmitting entity 150 may determine that the SDU discard procedure has been successfully completed based on receiving the MRW acknowledgment command indicating that the RLC receiving device has discarded the SDU and has moved the receive window in preparation for receiving the retransmitted SDU.

In an aspect (not shown), transmitting entity 150 may send the RLC RESET command to receiving entity 110 and, in response, receive the RLC RESET command acknowledgment. In an aspect (also not shown), transmitting entity 150 may receive the MRW command from receiving entity 110 and respond with an MRW command acknowledgment.

At 762, transmitting entity 150 retransmits SDU 730, starting with the first byte of the first PDU (e.g., PDU#1), to receiving entity 110. PDU#2 is retransmitted at 763, PDU#3 is retransmitted at 764, and PDU#4 is retransmitted at 765.

Figure 8:
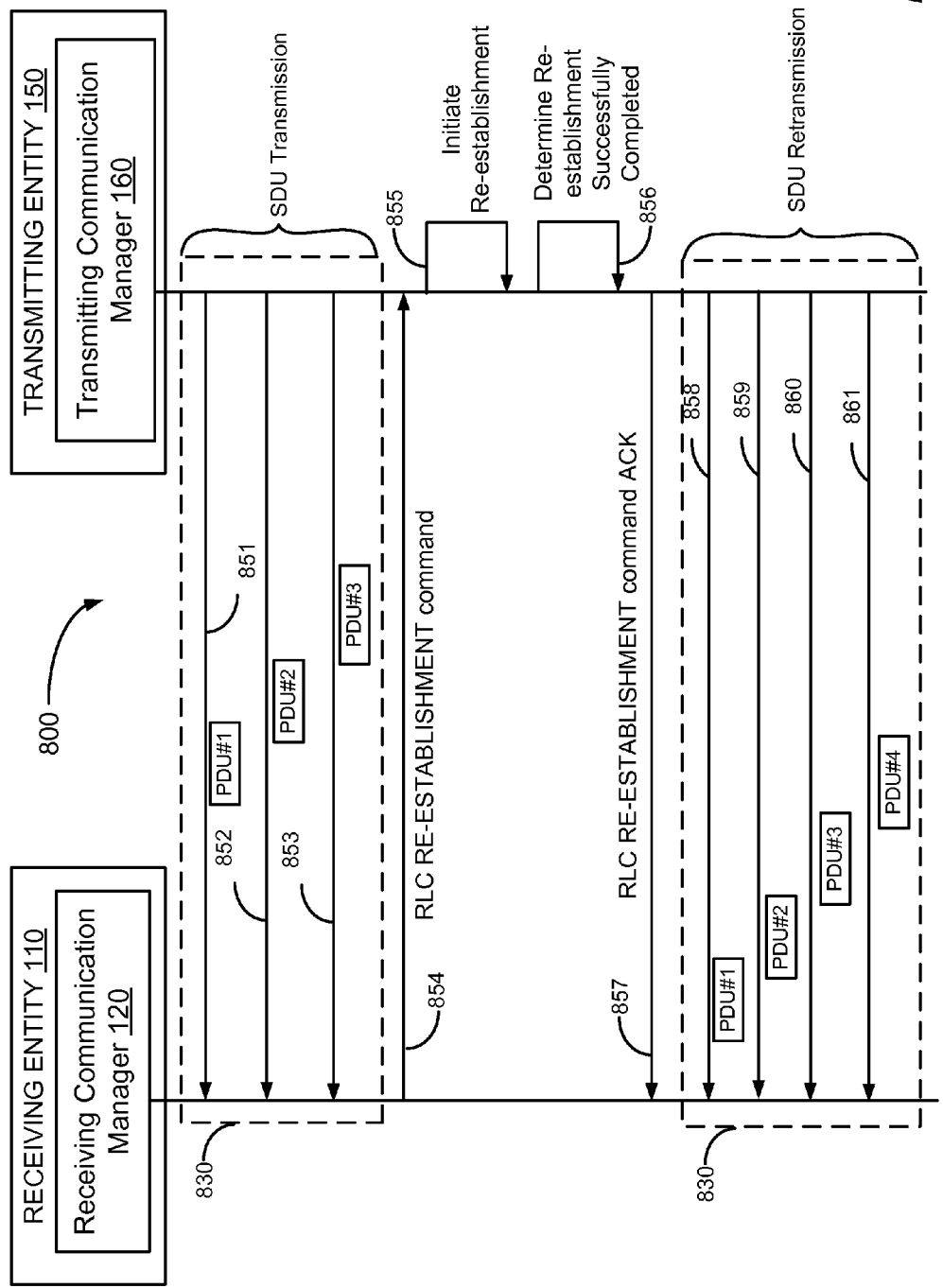
FIG. 8 is a message flow diagram of communications between a receiving entity within an RLC receiving protocol layer and a transmitting entity within an RLC transmitting protocol layer.

Referring to FIG. 8, a message flow 800 shows communication between receiving entity 110, including receiving communication manager 120, and transmitting entity 150, including transmitting communication manager 160 according to aspects of the present disclosure. The actions described herein with respect to message flow 700 may be performed by receiving communication manager 120 and/or transmitting communication manager 160. More particularly, and in the example of FIG. 8, receiving entity 110 and/or transmitting entity 150 may be protocol layers within a single device in communication with a network. For example, receiving entity 1109 and/or transmitting entity 150 may be an RRC layer and/or an RLC layer within the single device.

At 851, transmitting entity 150 begins transmission of an SDU 830. For example, SDU 830 may have been divided into four PDUs (PDU#1, PDU#2, PDU#3, and PDU#4) for transmission. At 852, transmitting entity 150 transmits PDU#2, and at 853, transmitting entity 150 transmits PDU#3. As such, and for example, by only transmitting PDU#1, PDU#2, and PDU#3, SDU 830 has only been partially-transmitted by transmitting entity 150 to receiving entity 110 at this point. Furthermore, and for example, SDU 830 may not be acknowledged (as received) by receiving entity 110 because it has not been completely transmitted (e.g., PDU#4 has not yet been transmitted).

At 854, transmitting entity 150 receives an RLC RE-ESTABLISHMENT command from receiving entity 110. The receiving entity 110 may send the RLC RE-ESTABLISHMENT command based on receiving an L3 RRC message from the network indicating that the RLC entity id to be re-established. In this example, and in an aspect, receiving entity 110 may be an RRC protocol layer within the same device as transmitting entity 150, which may be, in the aspect, an RLC protocol layer.

At 855, transmitting entity 150 initiates the re-establishment procedure. The re-establishment procedure may be performed by transmitting entity 150, via transmitting communication manager 160, as described herein with respect to FIG. 2. At 856, transmitting entity 150 determines that the re-establishment was successfully completed. As such, transmitting entity 150 may be prepared to re-send SDU 830, beginning with the first byte of PDU#1 of SDU 830.

At 857, transmitting entity 150 transmits an RLC RE-ESTABLISHMENT command acknowledgment to receiving entity 110. At 858, transmitting entity 150 begins re-transmitting the previously-transmitted SDU 830, starting with PDU#1, beginning with the first byte of the SDU 830.

Figure 9:
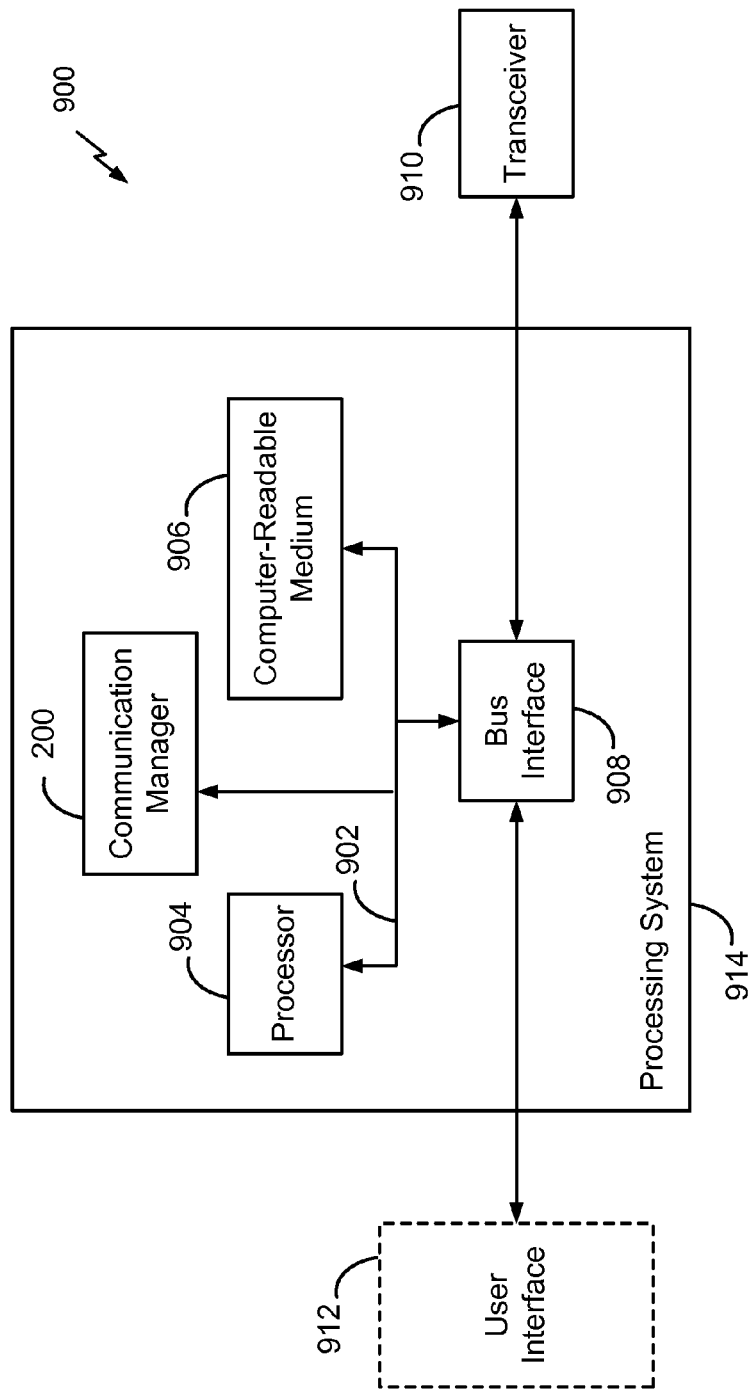
FIG. 9 is a block diagram of an example hardware implementation for an apparatus employing a processing system.

FIG. 9 is a block diagram illustrating an example of a hardware implementation for an apparatus 900 employing a processing system 914, including communication manager 200 (which may be receiving communication manager 120 and/or transmitting communication manager 160), for carrying out aspects of the present disclosure. In this example, the processing system 914 may be implemented with a bus architecture, represented generally by a bus 902. The bus 902 may include any number of interconnecting buses and bridges depending on the specific application of the processing system 914 and the overall design constraints. The bus 902 links together various circuits including one or more processors, represented generally by the processor 904, computer-readable media, represented generally by the computer-readable medium 906, and one or more components described herein, such as, but not limited to, communication manager 200. Communication manager 200, as described herein, may be receiving communication manager 120 and/or transmitting communication manager 160. The bus 902 also may link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) also may be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 also may be used for storing data that is manipulated by the processor 904 when executing software. In aspects, communication manager 200 may be, for example, a separate physical component or a virtual component implemented by processor 904 operating in conjunction with computer-readable medium 906 and bus interface 908.

Figure 10:
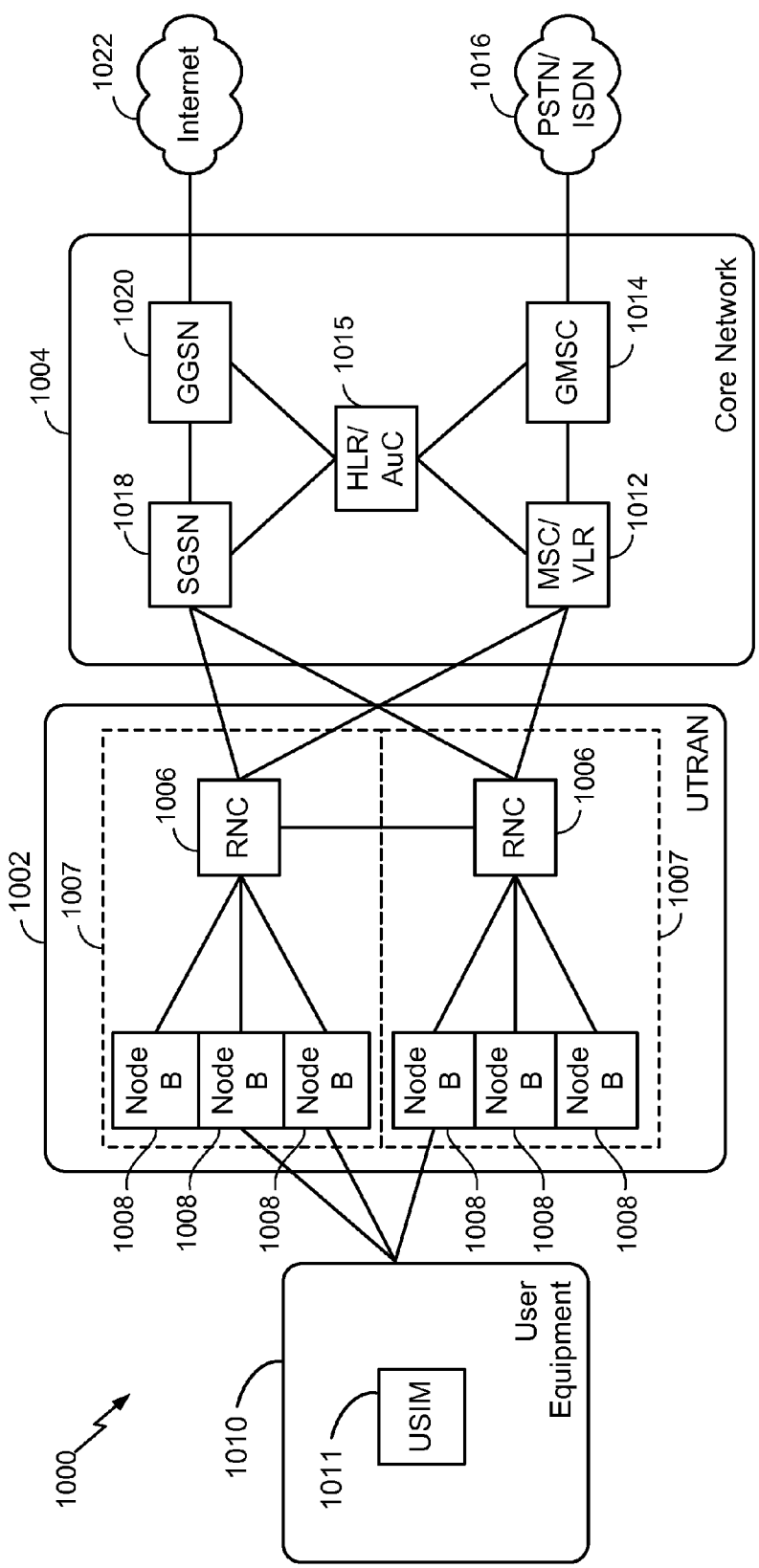
FIG. 10 is a block diagram of an example of a telecommunications system.

The various concepts presented throughout this disclosure may be implemented across a broad variety of telecommunication systems, network architectures, and communication standards. By way of example and without limitation, the aspects of the present disclosure illustrated in FIG. 10 are presented with reference to a UMTS system 1000, in which receiving entity 110 and/or transmitting entity 150 may operate, employing a W-CDMA air interface. A UMTS network includes three interacting domains: a Core Network (CN) 1004, a UMTS Terrestrial Radio Access Network (UTRAN) 1002, and User Equipment (UE) 1010. In an aspect, UE 1010 may be receiving entity 110 and/or transmitting entity 150. In this example, the UTRAN 1002 provides various wireless services including telephony, video, data, messaging, broadcasts, and/or other services. The UTRAN 1002 may include a plurality of Radio Network Subsystems (RNSs) such as an RNS 1007, each controlled by a respective Radio Network Controller (RNC) such as an RNC 1006. Here, the UTRAN 1002 may include any number of RNCs 1006 and RNSs 1007 in addition to the RNCs 1006 and RNSs 1007 illustrated herein. The RNC 1006 is an apparatus responsible for, among other things, assigning, reconfiguring, and releasing radio resources within the RNS 1007. The RNC 1006 may be interconnected to other RNCs (not shown) in the UTRAN 1002 through various types of interfaces such as a direct physical connection, a virtual network, or the like, using any suitable transport network.

Communication between a UE 1010 and a Node B 1008 may be considered as including a physical (PHY) layer and a medium access control (MAC) layer. Further, communication between a UE 1010 and an RNC 1006 by way of a respective Node B 1008 may be considered as including a radio resource control (RRC) layer. In the instant specification, the PHY layer may be considered layer 1; the MAC layer may be considered layer 7; and the RRC layer may be considered layer 3. Information hereinbelow utilizes terminology introduced in the RRC Protocol Specification, 3GPP TS 75.331 v9.1.0, incorporated herein by reference.

The geographic region covered by the RNS 1007 may be divided into a number of cells, with a radio transceiver apparatus serving each cell. A radio transceiver apparatus is commonly referred to as a Node B in UMTS applications, but also may be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1008 are shown in each RNS 1007; however, the RNSs 1007 may include any number of wireless Node Bs. The Node Bs 1008 provide wireless access points to a CN 1004 for any number of mobile apparatuses, and may be the receiving entity 110 and/or transmitting entity 150. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but also may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 1010 may further include a universal subscriber identity module (USIM) 1011, which contains a user's subscription information to a network. For illustrative purposes, one UE 1010 is shown in communication with a number of the Node Bs 1008. The DL, also called the forward link, refers to the communication link from a Node B 1008 to a UE 1010, and the UL, also called the reverse link, refers to the communication link from a UE 1010 to a Node B 1008.

The CN 1004 interfaces with one or more access networks, such as the UTRAN 1002. As shown, the CN 1004 is a GSM core network. However, as those skilled in the art will recognize, the various concepts presented throughout this disclosure may be implemented in a RAN, or other suitable access network, to provide UEs with access to types of CNs other than GSM networks.

The CN 1004 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1004 supports circuit-switched services with a MSC 1012 and a GMSC 1014. In some applications, the GMSC 1014 may be referred to as a media gateway (MGW). One or more RNCs, such as the RNC 1006, may be connected to the MSC 1012. The MSC 1012 is an apparatus that controls call setup, call routing, and UE mobility functions. The MSC 1012 also includes a VLR that contains subscriber-related information for the duration that a UE is in the coverage area of the MSC 1012. The GMSC 1014 provides a gateway through the MSC 1012 for the UE to access a circuit-switched network 1016. The GMSC 1014 includes a home location register (HLR) 1015 containing subscriber data, such as the data reflecting the details of the services to which a particular user has subscribed. The HLR is also associated with an authentication center (AuC) that contains subscriber-specific authentication data. When a call is received for a particular UE, the GMSC 1014 queries the HLR 1015 to determine the UE's location and forwards the call to the particular MSC serving that location.

The CN 1004 also supports packet-data services with a serving GPRS support node (SGSN) 1018 and a gateway GPRS support node (GGSN) 1020. GPRS, which stands for General Packet Radio Service, is designed to provide packet-data services at speeds higher than those available with standard circuit-switched data services. The GGSN 1020 provides a connection for the UTRAN 1002 to a packet-based network 1022. The packet-based network 1022 may be the Internet, a private data network, or some other suitable packet-based network. The primary function of the GGSN 1020 is to provide the UEs 1010 with packet-based network connectivity. Data packets may be transferred between the GGSN 1020 and the UEs 1010 through the SGSN 1018, which performs primarily the same functions in the packet-based domain as the MSC 1012 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 1008 and a UE 1010. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1010 provides feedback to the node B 1008 over the HS-DPCCH to indicate whether it correctly decoded a packet on the downlink.

HS-DPCCH further includes feedback signaling from the UE 1010 to assist the node B 1008 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 1008 and/or the UE 1010 may have multiple antennas supporting MIMO technology. The use of MIMO technology enables the node B 1008 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 1010 to increase the data rate or to multiple UEs 1010 to increase the overall system capacity. This is achieved by spatially precoding each data stream and then transmitting each spatially precoded stream through a different transmit antenna on the downlink. The spatially precoded data streams arrive at the UE(s) 1010 with different spatial signatures, which enables each of the UE(s) 1010 to recover the one or more the data streams destined for that UE 1010. On the uplink, each UE 1010 may transmit one or more spatially precoded data streams, which enables the node B 1008 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 11:
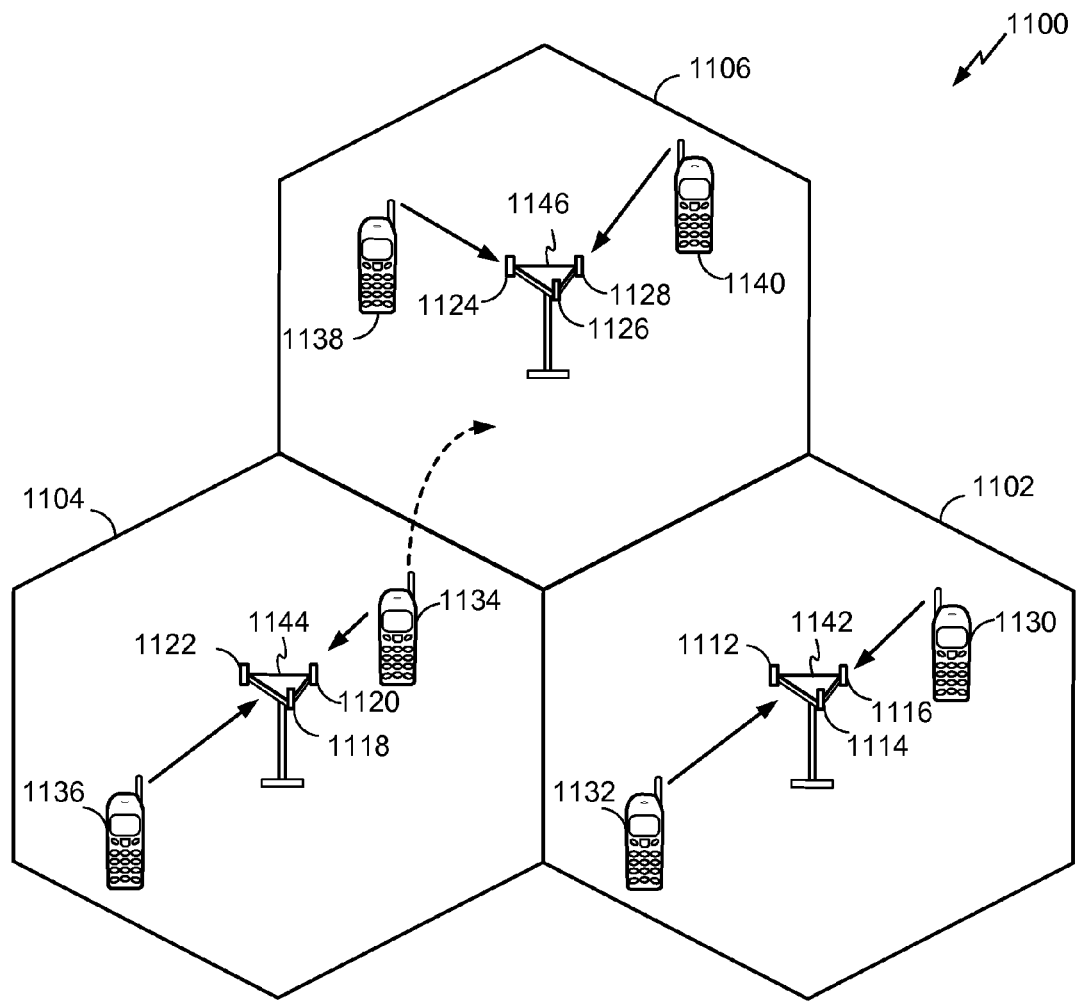
FIG. 11 is a block diagram of an example of an access network.

Referring to FIG. 11, an access network 1100 in a UTRAN architecture is illustrated in which receiving entity 110 and/or transmitting entity 150 may operate. Each of Nodes B 1142, 1144, 1146 and UEs 1130, 1132, 1134, 1136, 1138, 1140, as shown in FIG. 11, may be receiving entity 110 and/or transmitting entity 150 and may perform the aspects described herein.

The multiple access wireless communication system includes multiple cellular regions (cells), including cells 1102, 1104, and 1106, each of which may include one or more sectors. The multiple sectors can be formed by groups of antennas with each antenna responsible for communication with UEs in a portion of the cell. For example, in cell 1102, antenna groups 1112, 1114, and 1116 may each correspond to a different sector. In cell 1104, antenna groups 1118, 1120, and 1122 each correspond to a different sector. In cell 1106, antenna groups 1124, 1126, and 1128 each correspond to a different sector. The cells 1102, 1104 and 1106 may include several wireless communication devices, e.g., User Equipment or UEs, which may be in communication with one or more sectors of each cell 1102, 1104 or 1106. For example, UEs 1130 and 1132 may be in communication with Node B 1142, UEs 1134 and 1136 may be in communication with Node B 1144, and UEs 1138 and 1140 can be in communication with Node B 1146. Here, each Node B 1142, 1144, 1146 is configured to provide an access point to a CN 1004 (FIG. 10) for all the UEs 1130, 1132, 1134, 1136, 1138, 1140 in the respective cells 1102, 1104, and 1106.

As the UE 1134 moves from the illustrated location in cell 1104 into cell 1106, a serving cell change (SCC) or handover may occur in which communication with the UE 1134 transitions from the cell 1104, which may be referred to as the source cell, to cell 1106, which may be referred to as the target cell. Management of the handover procedure may take place at the UE 1134, at the Node Bs corresponding to the respective cells, at a radio network controller 1006 (FIG. 10), or at another suitable node in the wireless network. For example, during a call with the source cell 1104, or at any other time, the UE 1134 may monitor various parameters of the source cell 1104 as well as various parameters of neighboring cells such as cells 1106 and 1102. Further, depending on the quality of these parameters, the UE 1134 may maintain communication with one or more of the neighboring cells. During this time, the UE 1134 may maintain an Active Set, that is, a list of cells that the UE 1134 is simultaneously connected to (i.e., the UTRA cells that are currently assigning a downlink dedicated physical channel DPCH or fractional downlink dedicated physical channel F-DPCH to the UE 1134 may constitute the Active Set).

The modulation and multiple access scheme employed by the access network 1100 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 12:
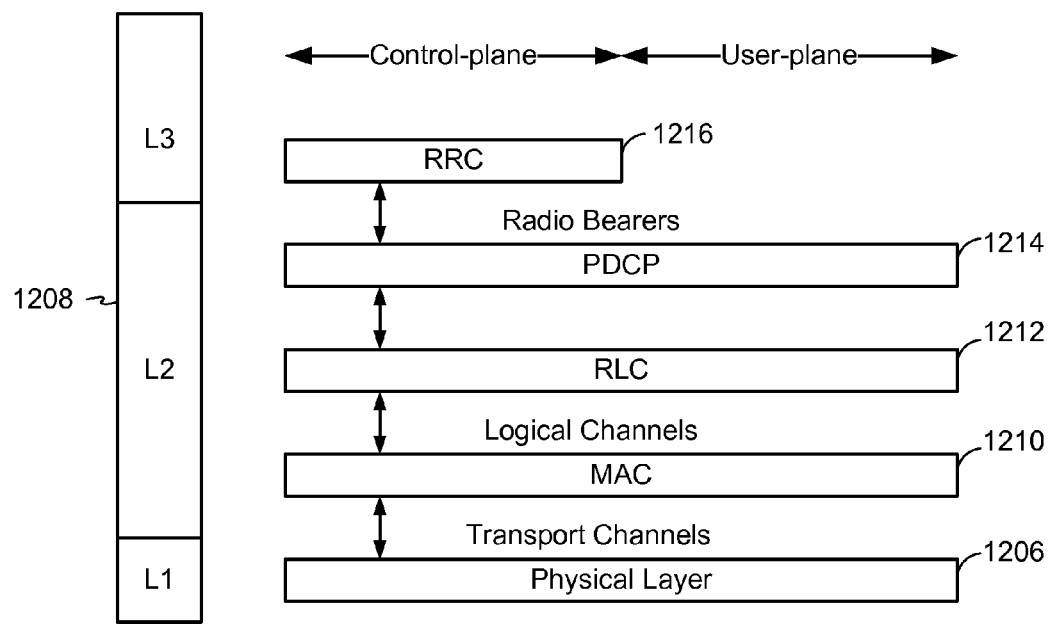
FIG. 12 is a block diagram of an example of a radio protocol architecture for the user and control plane.

The radio protocol architecture may take on various forms depending on the particular application. An example for an HSPA system will now be presented with reference to FIG. 12. FIG. 12 is a conceptual diagram illustrating an example of the radio protocol architecture for the user and control planes.

Turning to FIG. 12, the radio protocol architecture for the UE and Node B is shown with three layers: Layer 1, Layer 2, and Layer 3. The UE and/or Node B may be receiving entity 110 or transmitting entity 150 in an aspect where receiving entity 110 and transmitting entity 150 are peer RLC devices. In an aspect where receiving entity 110 and transmitting entity 150 are protocol layers within a single device, receiving entity 110 and transmitting entity 150 may be any one of Layers 1, 2, and/or 3 within UE and/or Node B.

Layer 1 is the lowest lower and implements various physical layer signal processing functions. Layer 1 will be referred to herein as the physical layer 1206. Layer 2 (L2 layer) 1208 is above the physical layer 1206 and is responsible for the link between the UE and node B over the physical layer 1206.

In the user plane, the L2 layer 1208 includes a media access control (MAC) sublayer 1210, a radio link control (RLC) sublayer 1212, and a packet data convergence protocol (PDCP) 1214 sublayer, which are terminated at the node B on the network side. Although not shown, the UE may have several upper layers above the L2 layer 1208 including a network layer (e.g., IP layer) that is terminated at a PDN gateway on the network side, and an application layer that is terminated at the other end of the connection (e.g., far end UE, server, or the like).

The PDCP sublayer 1214 provides multiplexing between different radio bearers and logical channels. The PDCP sublayer 1214 also provides header compression for upper layer data packets to reduce radio transmission overhead, security by ciphering the data packets, and handover support for UEs between Node Bs. The RLC sublayer 1212 provides segmentation and reassembly of upper layer data packets, retransmission of lost data packets, and reordering of data packets to compensate for out-of-order reception due to hybrid automatic repeat request (HARQ). The MAC sublayer 1210 provides multiplexing between logical and transport channels. The MAC sublayer 1210 is also responsible for allocating the various radio resources (e.g., resource blocks) in one cell among the UEs. The MAC sublayer 1210 is also responsible for HARQ operations.

Figure 13:
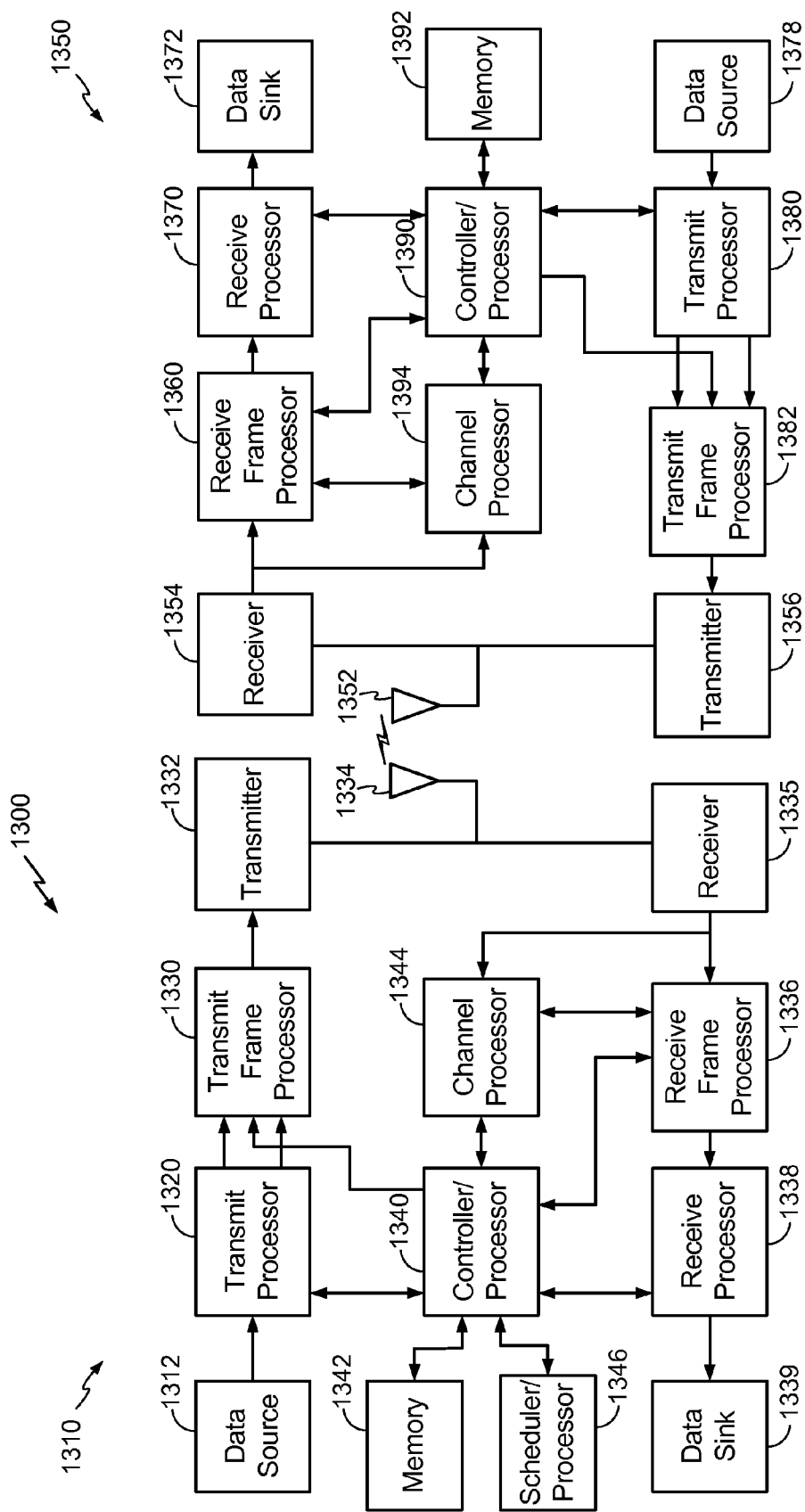
FIG. 13 is a block diagram of an example of a Node B in communication with a UE in a telecommunications system.

FIG. 13 is a block diagram of a Node B 1310 in communication with a UE 1350, where the Node B 1310 and/or UE 1350 may be receiving entity 110 and/or transmitting entity 150. In the downlink communication, a transmit processor 1320 may receive data from a data source 1312 and control signals from a controller/processor 1340. The transmit processor 1320 provides various signal processing functions for the data and control signals, as well as reference signals (e.g., pilot signals). For example, the transmit processor 1320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1344 may be used by a controller/processor 1340 to determine the coding, modulation, spreading, and/or scrambling schemes for the transmit processor 1320. These channel estimates may be derived from a reference signal transmitted by the UE 1350 or from feedback from the UE 1350. The symbols generated by the transmit processor 1320 are provided to a transmit frame processor 1330 to create a frame structure. The transmit frame processor 1330 creates this frame structure by multiplexing the symbols with information from the controller/processor 1340, resulting in a series of frames. The frames are then provided to a transmitter 1332, which provides various signal conditioning functions including amplifying, filtering, and modulating the frames onto a carrier for downlink transmission over the wireless medium through antenna 1334. The antenna 1334 may include one or more antennas, for example, including beam steering bidirectional adaptive antenna arrays or other similar beam technologies.

At the UE 1350, a receiver 1354 receives the downlink transmission through an antenna 1352 and processes the transmission to recover the information modulated onto the carrier. The information recovered by the receiver 1354 is provided to a receive frame processor 1360, which parses each frame, and provides information from the frames to a channel processor 1394 and the data, control, and reference signals to a receive processor 1370. The receive processor 1370 then performs the inverse of the processing performed by the transmit processor 1320 in the Node B 1310. More specifically, the receive processor 1370 descrambles and despreads the symbols, and then determines the most likely signal constellation points transmitted by the Node B 1310 based on the modulation scheme. These soft decisions may be based on channel estimates computed by the channel processor 1394. The soft decisions are then decoded and deinterleaved to recover the data, control, and reference signals. The CRC codes are then checked to determine whether the frames were successfully decoded. The data carried by the successfully decoded frames will then be provided to a data sink 1372, which represents applications running in the UE 1350 and/or various user interfaces (e.g., display). Control signals carried by successfully decoded frames will be provided to a controller/processor 1390. When frames are unsuccessfully decoded by the receiver processor 1370, the controller/processor 1390 also may use an acknowledgement (ACK) and/or negative acknowledgement (NACK) protocol to support retransmission requests for those frames.

In the uplink, data from a data source 1378 and control signals from the controller/processor 1390 are provided to a transmit processor 1380. The data source 1378 may represent applications running in the UE 1350 and various user interfaces (e.g., keyboard). Similar to the functionality described in connection with the downlink transmission by the Node B 1310, the transmit processor 1380 provides various signal processing functions including CRC codes, coding and interleaving to facilitate FEC, mapping to signal constellations, spreading with OVSFs, and scrambling to produce a series of symbols. Channel estimates, derived by the channel processor 1394 from a reference signal transmitted by the Node B 1310 or from feedback contained in the midamble transmitted by the Node B 1310, may be used to select the appropriate coding, modulation, spreading, and/or scrambling schemes. The symbols produced by the transmit processor 1380 will be provided to a transmit frame processor 1382 to create a frame structure. The transmit frame processor 1382 creates this frame structure by multiplexing the symbols with information from the controller/processor 1390, resulting in a series of frames. The frames are then provided to a transmitter 1356, which provides various signal conditioning functions including amplification, filtering, and modulating the frames onto a carrier for uplink transmission over the wireless medium through the antenna 1352.

The uplink transmission is processed at the Node B 1310 in a manner similar to that described in connection with the receiver function at the UE 1350. A receiver 1335 receives the uplink transmission through the antenna 1334 and processes the transmission to recover the information modulated onto the carrier. The information recovered by the receiver 1335 is provided to a receive frame processor 1336, which parses each frame, and provides information from the frames to the channel processor 1344 and the data, control, and reference signals to a receive processor 1338. The receive processor 1338 performs the inverse of the processing performed by the transmit processor 1380 in the UE 1350. The data and control signals carried by the successfully decoded frames may then be provided to a data sink 1339 and the controller/processor, respectively. If some of the frames were unsuccessfully decoded by the receive processor, the controller/processor 1340 also may use an acknowledgement (ACK) and/or negative acknowledgement (NACK) protocol to support retransmission requests for those frames.

The controller/processors 1340 and 1390 may be used to direct the operation at the Node B 1310 and the UE 1350, respectively. For example, the controller/processors 1340 and 1390 may provide various functions including timing, peripheral interfaces, voltage regulation, power management, and other control functions. The computer readable media of memories 1342 and 1392 may store data and software for the Node B 1310 and the UE 1350, respectively. A scheduler/processor 1346 at the Node B 1310 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and also may be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, or the like UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, or the like UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, or the like and/or may not include all of the devices, components, modules or the like discussed in connection with the figures. A combination of these approaches also may be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communication, comprising:
   transmitting at least one protocol data unit (PDU) from a transmitting entity to a receiving entity, wherein the at least one PDU is part of a service data unit (SDU);
   determining to perform a communication re-establishment;
   in response to determining to perform the communication re-establishment,
      transmitting a move receive window (MRW) command to the receiving entity;
      receiving an MRW command acknowledgment from the receiving entity indicating that the receiving entity has discarded the SDU and has moved a receive window in preparation for receiving a retransmitted SDU; and
      retransmitting the SDU, beginning with a first PDU transmitted as part of the SDU.

2. The method of claim 1, wherein the transmitting entity is a radio link control (RLC) transmitting device and the receiving entity is an RLC receiving device in communication with one another across a network.

3. The method of claim 2,
   wherein the determining to perform the communication re-establishment comprises:
      initiating an SDU discard procedure, and
      determining that the SDU discard procedure has been successfully completed;
   wherein retransmitting the SDU to the RLC receiving device comprises retransmitting beginning at a first byte of the SDU.

4. The method of claim 3,
   wherein the initiating is based on receiving a radio link control (RLC) RESET command from the RLC receiving device, and
   further comprising transmitting an RLC RESET command acknowledgement message to the RLC receiving device based on determining that the SDU discard procedure has been successfully completed.

5. The method of claim 3,
   wherein the initiating is based on sending a radio link control (RLC) RESET command to the RLC receiving device, and
   wherein the determining that the SDU discard procedure has been successfully completed comprises receiving an RLC RESET command acknowledgment message from the RLC receiving device, wherein the acknowledgment message indicates that the SDU discard procedure has been successfully completed.

6. The method of claim 1, wherein the transmitting entity is a radio link control (RLC) transmitting protocol layer and the receiving entity is a radio link control (RLC) receiving protocol layer both within a protocol stack of a device.

7. The method of claim 6,
   wherein the transmitting comprises transmitting from the RLC transmitting protocol layer to the RLC receiving protocol layer, and
   wherein the determining to perform the communication re-establishment comprises:
      receiving a message indicating the communication re-establishment;
      determining that the communication re-establishment has been successfully completed; and
      retransmitting the SDU comprises retransmitting, beginning at a first byte of the SDU, to the RLC receiving protocol layer.

8. The method of claim 7, wherein the message comprises a layer 3 (L3) message.

9. The method of claim 7,
   wherein the initiating is based on receiving a radio link control (RLC) RE-ESTABLISHMENT command from the RLC receiving protocol layer, and
   further comprising transmitting an acknowledgement message to the RLC receiving protocol layer based on determining that the re-establishment has been successfully completed.

10. A method for wireless communication, comprising:
    transmitting at least one protocol data unit (PDU) from a transmitting entity to a receiving entity, wherein the at least one PDU is part of a service data unit (SDU);
    determining to perform a communication re-establishment;
    in response to determining to perform the communication re-establishment,
       receiving a move receive window (MRW) command from the receiving entity;
       transmitting an MRW command acknowledgment to the receiving entity indicating that the transmitting entity has discarded the SDU and has moved a receive window for the SDU; and
       retransmitting the SDU, beginning with a first PDU transmitted as part of the SDU.

11. A non-transitory computer-readable medium storing computer executable code for wireless communication, comprising:
    code for causing a computer to:
       transmit at least one protocol data unit (PDU) from a transmitting entity to a receiving entity, wherein the at least one PDU is part of a service data unit (SDU);
       determine to perform a communication re-establishment;
       in response to determining to perform the communication re-establishment,
          transmit a move receive window (MRW) command to the receiving entity;
          receive an MRW command acknowledgment from the receiving entity indicating that the receiving entity has discarded the SDU and has moved a receive window in preparation for receiving a retransmitted SDU; and
          retransmit the SDU, beginning with a first PDU transmitted as part of the SDU.

12. An apparatus for wireless communication, comprising:
means for transmitting at least one protocol data unit (PDU) from a transmitting entity to a receiving entity, wherein the at least one PDU is part of a service data unit (SDU);
means for determining to perform a communication re-establishment;
means for transmitting a move receive window (MRW) command to the receiving entity in response to determining to perform the communication re-establishment;
means for receiving an MRW command acknowledgment from the receiving entity indicating that the receiving entity has discarded the SDU and has moved a receive window in preparation for receiving a retransmitted SDU; and
means for retransmitting the SDU, beginning with a first PDU transmitted as part of the SDU.

13. An apparatus for wireless communication, comprising:
at least one memory; and
a communication manager in communication with the at least one memory and configured to:
transmit at least one protocol data unit (PDU) from a transmitting entity to a receiving entity, wherein the at least one PDU is part of a service data unit (SDU);
determine to perform a communication re-establishment;
in response to determining to perform the communication re-establishment,
transmit a move receive window (MRW) command to the receiving entity;
receive an MRW command acknowledgment from the receiving entity indicating that the receiving entity has discarded the SDU and has moved a receive window in preparation for receiving a retransmitted SDU; and
retransmit the SDU, beginning with a first PDU transmitted as part of the SDU.

14. The apparatus of claim 13, wherein the transmitting entity is a radio link control (RLC) transmitting device and the receiving entity is an RLC receiving device in communication with one another across a network.

15. The apparatus of claim 14,
wherein the communication manager being configured to determine to perform the communication re-establishment comprises the communication manager configured to:
initiate an SDU discard procedure; and
determine that the SDU discard procedure has been successfully completed, and
wherein the communication manager being configured to retransmit the SDU to the RLC receiving device comprises the communication manager being configured to retransmit beginning at a first byte of the SDU.

16. The apparatus of claim 15,
wherein the communication manager being configured to initiate the SDU discard procedure is based on the communication manager configured to receive a radio link control (RLC) RESET command from the RLC receiving device, and
further comprising the communication manager configured to transmit an RLC RESET command acknowledgement message to the RLC receiving device based on the communication manager configured to determine that the SDU discard procedure has been successfully completed.

17. The apparatus of claim 15,
wherein the communication manager being configured to initiate is based on the communication manager configured to send a radio link control (RLC) RESET command to the RLC receiving device, and
wherein the communication manager being configured to determine that the SDU discard procedure has been successfully completed comprises the communication manager configured to receive an RLC RESET command acknowledgment message from the RLC receiving device, wherein the acknowledgment message indicates that the SDU discard procedure has been successfully completed.

18. The apparatus of claim 13, wherein the transmitting entity is a radio link control (RLC) transmitting protocol layer and the receiving entity is a radio link control (RLC) receiving protocol layer both within a protocol stack of a device.

19. The apparatus of claim 18,
wherein the communication manager being configured to transmit comprises the communication manager configured to transmit from the RLC transmitting protocol layer to the RLC receiving protocol layer, and
wherein the communication manager being configured to determine to perform the communication re-establishment comprises the communication manager configured to:
receive a message indicating the communication re-establishment;
determine that the communication re-establishment has been successfully completed; and
retransmit the SDU comprises retransmitting, beginning at a first byte of the SDU, to the RLC receiving protocol layer.

20. The apparatus of claim 19, wherein the message comprises a layer 3 (L3) message.

21. The apparatus of claim 19,
wherein the communication manager being configured to initiate is based on the communication manager configured to receive a radio link control (RLC) RE-ESTABLISHMENT command from the RLC receiving protocol layer, and
further comprising the communication manager configured to transmit an acknowledgement message to the RLC receiving protocol layer based on the communication manager being configured to determine that the re-establishment has been successfully completed.

22. An apparatus for wireless communication, comprising:
at least one memory; and
a communication manager in communication with the at least one memory and configured to:
transmit at least one protocol data unit (PDU) from a transmitting entity to a receiving entity, wherein the at least one PDU is part of a service data unit (SDU);
determine to perform a communication re-establishment;
in response to determining to perform the communication re-establishment,
receive a move receive window (MRW) command from the receiving entity;
transmit an MRW command acknowledgment to the receiving entity indicating that the transmitting entity has discarded the SDU and has moved a receive window for the SDU; and
retransmit the SDU, beginning with a first PDU transmitted as part of the SDU.

* * * * *